United States Patent Office 3,182,025
Patented May 4, 1965

3,182,025
CATALYST DEMETALLIZATION
Larry L. Simantel, Harvey, Ill., assignor, by mesne assignments, to Sinclair Research, Inc., New York, N.Y., a corporation of Delaware
No Drawing. Filed Jan. 23, 1961, Ser. No. 83,921
The portion of the term of the patent subsequent to Feb. 25, 1981, has been disclaimed
9 Claims. (Cl. 252—415)

This invention concerns the removal of poisoning metal from a synthetic gel hydrocarbon conversion catalyst which has been contaminated with metal by use in the high temperature catalytic conversion of feedstocks containing such metal. The invention may be used alone or as a part of an overall metals-removal procedure employing a plurality of processing steps to increase the amount of vanadium or other metal contaminants removed by the process. The invention comprises chlorination of the poisoned catalyst at a moderately elevated temperature outside the conversion system with a vaporous chlorinating mixture to provide and/or remove poisoning metals in the chloride form. This chlorinating mixture comprises molecular chlorine and carbon disulfide.

The effectiveness of the metals removal may be significantly increased by subjecting the catalyst after conventional regeneration, to treatment with a gas containing molecular oxygen and/or to a sulfiding gas at an elevated temperature before chlorination. Other processing steps may also be employed. Copending applications, Serial Nos. 758,681, filed September 3, 1958, now abandoned; 763,833 and 763,834, filed September 29, 1958, both now abandoned; 767,794, filed October 17, 1958, now abandoned; 842,618, filed September 28, 1959, now abandoned; 849,199, filed October 28, 1959, now abandoned; 19,313, filed April 1, 1960, now abandoned; 39,810, filed June 30, 1960; 47,598, filed August 4, 1960; 53,380, filed September 1, 1960, now U.S. Patent 3,122,-497; 53,623, filed September 2, 1960; 54,368, now U.S. Patent 3,122,512; 54,405, now U.S. Patent 3,122,510 and 54,532, now abandoned, filed September 7, 1960; 55,129, 55,160 and 55,184, filed September 12, 1960; 55,703, filed September 13, 1960; 55,838, filed September 14, 1960, now abandoned; 67,518, filed November 7, 1960; and 73,199, filed December 2, 1960, all of which are hereby incorporated by reference described procedures by which vanadium and other poisoning metals included in a solid oxide hydrocarbon conversion catalyst are removed by subjecting the catalyst, outside the hydrocarbon conversion system, to elevated temperature conditions which put metal contaminants into a water-dispersible or more available form. This invention provides for greater metal removal when practiced in conjunction with these and other procedures.

Catalytically promoted methods for the chemical conversion of hydrocarbons include cracking, hydrocracking, reforming, hydroforming, etc. Such reactions generally are performed at elevated temperatures, for example, about 300 to 1200° F., more often 600 to 1000° F. Feedstocks to these processes comprise normally liquid and solid hydrocarbons which at the temperature of the conversion reaction are generally in the fluid, i.e., liquid or vapor, state and the products of the conversion frequently are lower-boiling materials.

In particular, cracking of heavier hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 750 to 1050° F., preferably about 850 to 975° F., at pressures up to about 100 p.s.i.g., preferably about atmospheric to 5–15 p.s.i.g., and advantageously without substantial addition of free hydrogen to the system. In cracking, the feedstock is usually a mineral oil or petroleum hydrocarbon fraction such as straight run or recycle gas oils or other normally liquid hydrocarbons boiling above the gasoline range.

Solid oxide catalysts have long been recognized as useful in catalytically promoting conversion of hydrocarbons. For cracking processes, the catalysts which have received the widest acceptance today are usually activated or calcined predominantly silica or silica-based, e.g., silica-alumina, silica-magnesia, silica-zirconia, etc., compositions in a state of slight hydration and containing small amounts of acidic oxide promoters in many instances. The oxide catalyst may be alumina- or silica-based and ordinarily contains a substantial amount of a gel or gelatinous precipitate comprising a major portion of silica and at least one other material, such as alumina, zirconia, etc. These oxides may also contain small amounts of other inorganic materials, but current practice in catalytic cracking leans more toward the exclusion from the silica hydrate materials of foreign constituents such as alkaline metal salts which may cause sintering of the catalyst surface on regeneration and a drop in catalytic activity. For this reason, the use of wholly or partially synthetic gel or gelatinous catalysts, which are more uniform and less damaged by high temperatures in treatment and regeneration, is often preferable. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalyst may be only partially of synthetic material; for example it may be made by the precipitation of silica-alumina on clay, such as kaolinite or halloysite. One such semi-synthetic catalyst contains about equal amounts of silica-alumina gel and clay.

The manufacture of synthetic gel catalysts can be performed, for instance (1) by impregnating silica with alumina salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by a combination of hydrated silica with other hydrate bases as, for instance, zirconia, etc. These synthetic gel-type catalysts are activated or calcined before use.

The physical form of the catalyst varies with the type of manipulative process to which it will be exposed. In a fixed-bed process, a series of catalytic reactors may be used, some being on steam and others in the process of cleaning, regeneration, etc. In circulating catalyst systems, such as those of the fluid catalytic and "TCC" processes, catalyst moves through a reaction zone and then through a regeneration zone. In the fluid process, gases are used to convey the catalyst and to keep it in the form of a dense turbulent bed which has no definite upper interface between the dense (solid) phase and the suspended (gaseous) phase mixture of catalyst and gas. This type of processing requires the catalyst to be in the form of a fine powder, generally in a size range of about 20 to 150 microns. In the "TCC" or "Thermofor" process the catalyst is in the form of beads which are conveyed by elevators. Generally these beads may range in size up to about ½" in diameter. When fresh, the minimum sized bead is generally about ⅛". Other types of process use other forms of catalyst such as tablets or extruded pellets.

One of the most important phases of study in the improvement of catalyst performance in hydrocarbon conversion is in the area of metals poisoning. Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. Thus Venezuelan crudes or their fractions make ideal feeds for the present process when the demetallization is essentially just the chlorination or other steps designed primarily for vanadium removal. Most of the metals, when present in a stock, deposit in a relatively non-volatile form on the catalyst during the conversion processes so that regeneration of the catalyst to remove coke does not remove these contaminants.

Of the various metals which are to be found in representative hydrocarbon feedstocks some, like the alkali metals, only deactivate the catalyst without changing the product distribution; therefore, they might be considered true poisons. Others such as nickel, vanadium and copper markedly alter the selectivity and activity of cracking reactions if allowed to accumulate. A poisoned catalyst generally produces a higher yield of coke and hydrogen at the expense of desired products, such as gasoline and butanes. For instance, it has been shown that the yield of butanes, butylenes and gasoline, based on converting 60 volume percent of cracking feed to lighter material and coke dropped from 58.5 to 49.6 vol. percent when the amount of nickel on the catalyst increased from 55 p.p.m. to 645 p.p.m. and the amount of vanadium increased from 145 p.p.m. to 1480 p.p.m. in fluid catalytic cracking of a feedstock containing some metal contaminated stocks. Since many cracking units are limited by coke burning or gas handling facilities, increased coke or gas yields require a reduction in conversion or throughput to stay within the unit capacity.

An alternative to letting catalyst metals level increase and activity decrease is to diminish the overall metal content by raising catalyst replacement rates. Either approach, letting metals level increase, or increasing catalyst replacement rates, must be balanced against product value and operating costs to determine the most economic way of operating. The optimum metal level at which to operate any cracking unit will be a function of many factors including feedstock metal content, type and cost of catalyst, overall refinery balance, etc., and can be determined by a comprehensive study of the refinery's operations.

A further alternative, demetallizing the catalyst, which avoids discarding of expensive catalyst and enables much lower grade, high metals-contaminated feedstocks to be used, is possible in this invention. In the process of this invention a catalyst contaminated with vanadium with or without nickel by use in converting a petroleum feedstock containing such metal may be treated for removal of vanadium and perhaps nickel. Although referred to as "metals," these catalyst contaminants may be in the form of free metals or relatively non-volatile metal compounds. It is to be understood that the term "metal" used herein refers to either form.

Commercially used cracking catalysts are the result of years of study and research into the nature of cracking catalysis, and the cost of these catalysts is not negligible. The cost frequently makes highly poisoned feedstocks less desirable to use in cracking operations, even though they may be in plentiful supply, because of their tendency to damage the expensive catalysts. The expense of such catalysts, however, is justified because the composition, structure, porosity and other characteristics of such catalysts are rigidly controlled so that they may give optimum results in cracking. It is important, therefore, that removing poisoning metals from the catalyst does not jeopardize the desired chemical and physical constitution of the catalyst. Although methods have been suggested in the past for removing poisoning metals from a catalyst which has been used for high temperature hydrocarbon conversions, for example, the processes of U.S. Patents 2,481,253, 2,488,718, 2,488,744, 2,668,798 and 2,693,455, the process of this invention is particularly effective to remove vanadium and other metals without endangering the expensive catalyst.

In this invention the hydrocarbon petroleum oils utilized as feedstock for a conversion process may be of any desired type normally utilized in catalytic conversion operations. This feedstock contains vanadium, sometimes as much as 3%, and the catalyst may be used as a fixed, moving or fluidized bed or may be in a more dispersed state. For typical operations, the catalytic cracking of the hydrocarbon feed would often result in a conversion of about 50 to 60% of the feedstock into a product boiling in the gasoline boiling range. The catalytic conversion system also includes a regeneration procedure in which the catalyst is contacted periodically with free oxygen-containing gas in order to restore or maintain the activity of the catalyst by removing carbon or carbonaceous-type deposits. It will be understood that in this specification and claims "regeneration" refers to this carbon burn-off procedure. Ordinarily, the catalysts are taken from the hydrocarbon conversion system and treated before the poisoning metals have reached an undesirably high level, for instance, about 2%, generally no more than about 1% maximum, content of vanadium and nickel.

In this invention, vapor phase chlorination takes place at a moderately elevated temperature up to about 700° F. or even up to about 900 or 1000° F., wherein the catalyst composition and structure is not materially harmed by the treatment and a substantial amount of the poisoning metals present on the catalyst surface is converted to chlorides. The chlorination usually takes place at a temperature of at least about 300° F., preferably about 550 to 650° F., with optimum results being obtained close to about 600° F. The chlorination, even when conducted in the lower temperature ranges, e.g., below about 550° F., is effective for conversion to chlorides of the metal poisons, being rather complete in the case of nickel. In the higher temperature ranges, above about 550° F., the treatment with the vaporous chlorinating mixture serves simultaneously also to remove, by volatilization, vanadium chlorides such as vanadium oxychloride and/or vanadium tetrachloride formed by chlorination. When volatilization of these compounds is not completed during chlorination, the chlorination may be followed by a purge with an inert gas such as nitrogen or flue gas in these higher temperature ranges, that is, about 550° F. to 700° F. or 1000° F. for volatilization of these compounds. Also, further metal chlorides, particularly nickel, can be removed subsequent to the chlorination by contacting the catalyst with a liquid aqueous medium or by other procedures. In the process, the metals may be in the chloride form when separated from the catalyst or may be converted from the chloride to another form for the actual separation; however, in either situation, metal components which are chlorinated are removed from the catalyst. The chlorination is performed by contact with a vaporous mixture containing chlorine, carbon and sulfur. In the process of this invention carbon disulfide and a chlorine vapor, in the free or combined form, are supplied to the chlorination zone, preferably the bottom region of a fluidized bed of the catalyst to be demetallized. The carbon disulfide is generally introduced as a liquid after a sufficient flow of chlorine has been established through the bed of catalyst although it may also be introduced into the chlorinator as a vapor.

Molecular chlorine, HCl or other chlorine-supplying material which is a vapor under the conditions of chlorination is supplied to the chlorination zone in an amount at least sufficient to convert the metal contaminants to their chloride form. The stoichiometric amount of chlorine required to convert the metal poisons to their most highly chlorinated compounds is in the neighborhood of only about 0.001 gram per gram of catalyst; however, a much larger amount of chlorine, say about 0.5 to 15 percent based on the weight of the catalyst is generally desirable since it serves to keep the vanadium in its higher, more volatile valence state; that is, the vanadium is maintained as $VOCl_3$ or $VCl_4$. The amount of carbon disulfide introduced is generally about 0.5 to 6% based on the weight of the catalyst and advantageously the ratio of molecular chlorine or other chlorine supplying material to the carbon disulfied is about 0.8 to 30/1 and preferably about 2 to 10/1. The total amount of chlorinating mixture will generally be about 1 to 20%, preferably about 2 to 12% based on the weight of the catalyst being treated. The chlorinating mixture is essentially anhydrous, that is, if changed to the liquid state no separate aqueous phase would be observed. As the amount of water in the chlorinating mixture increases, additional time and/or chlorinating mixture may be required to obtain a given amount of metal removal. This inhibiting effect is also evident when water is present in the catalyst so that it is preferred that the catalyst contain less than about 1 or 2% volatile matter, that is, matter which is removable by heating to 1000° C. A pressure of about 0–100 or more p.s.i.g., preferably 0–15 p.s.i.g. may be maintained in chlorination, the contacting usually lasting for at least about five minutes, preferably about 15 minutes to an hour, but shorter or longer reaction periods may be possible or needed, for instance, depending on the linear velocity of the vapors.

The chlorinating mixture consists essentially of carbon, sulfur and chlorine containing vapors, of which part or all may consist of sulfur and carbon chlorides formed by the reaction of the carbon disulfide and the chlorine-containing vapor.

Where chlorination alone produces the demetallization desired, for example, where vanadium is the principal poison on the catalyst and the chlorination, properly performed, removes the desired amount of poison, the catalyst is conducted after chlorination to its conversion system. Prior to reusing the catalyst in the hydrocarbon conversion operation, it can be calcined in air say at temperatures usually in the range of about 700 to 1300° F., conveniently by addition to the cracking unit catalyst regenerator. Prolonged treatment with an oxygen-containing gas at above about 1100° F. may sometimes be disadvantageous. Calcination removes free water, if any is present, and perhaps some, but not all of the combined water, and leaves the catalyst in an active state without undue sintering of its surface. Such a treatment is of further value for the removal of entrained chlorine gas and chlorides from the catalyst which may cause undesired results in further use of the catalyst.

The process of this invention produces significantly greater removal of vanadium when, upon removal of the vanadium-poisoned catalyst from the reactor, it is regenerated and given a treatment at elevated temperatures with molecular oxygen-containing gas before chlorination. Also, vanadium removal may be accomplished, in lieu of purging, by washing the catalyst, after chlorination, with an aqueous solution containing ammonium ions before returning the catalyst to the hydrocarbon conversion system as disclosed in copending application S.N. 39,810, filed June 30, 1960. Prior to other treatments, subjecting the poisoned catalyst sample to magnetic flux may be found desirable to remove any tramp iron particles which may have become mixed with the catalyst.

Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about a few minutes, e.g., 3–10, and the oxygen content of the effluent gases from the regenerator is desirably less than about ½%. When later oxygen treatment is employed in this invention, the regeneration of any particular quantum of catalyst is generally regulated to give a carbon content of less than about 0.5%.

Treatment of the regenerated catalyst with molecular oxygen-containing gas to increase vanadium removal is described in copending applications Serial Nos. 19,313 and 55,160. The temperature of this treatment is generally in the range of about 1000 to 1800° F. but below a temperature where the catalyst undergoes any substantial deleterious change in its physical or chemical characteristics. The catalyst is, as pointed out, in a substantially carbon-free condition during this high-temperature treatment. If any significant amount of carbon is present in the catalyst at the start of this high-temperature treatment, the essential oxygen contact is that continued after carbon removal. In any event, after carbon removal, the oxygen treatment of the essentially carbon-free catalyst is at least long enough to stabilize a substantial amount of vanadium in its highest valence state, as evidenced by a significant increase, say at least about 10%, preferably at least about 100%, in the vanadium removal in subsequent stages of the process. This increase is over and above that which would have been obtained by the metals removal steps without the oxygen treatment.

The treatment of the vanadium-poisoned catalyst with molecular oxygen-containing gas prior to the chlorination is preferably performed at a temperature of about 1150 to 1350 or even as high as 1600° F. and usually is at least about 50° F. higher than the regeneration temperature. Little or no effect on vanadium removal is accomplished by treatment at temperatures significantly below about 1000° F., even for an extended time. The upper temperature, to avoid undue catalyst damage, will usually not materially exceed about 1600 or 1800° F. Preferably the temperature is about 1150 to 1350° F. The duration of the oxygen treatment and the amount of vanadium prepared by the treatment for subsequent removal is dependent upon the temperature and the characteristics of the equipment used. The length of the oxygen treatment may vary from the short time necessary to produce an observable effect in the later treatment, say, a quarter of an hour, to a time just long enough not to damage the catalyst. In a relatively static apparatus such as a muffle furnace, the effectiveness of the treatment can increase with the time over a rather extended period; in other types of apparatus, however, such as a flow reactor, where there is more thorough contact of catalyst and gas, little increase in effectiveness has been observed after about four hours of treatment.

The oxygen-containing gas used in the treatment contains molecular oxygen as the essential active ingredient, and there is little significant consumption of oxygen in this treatment. The gas may be oxygen, or a mixture of oxygen with inert gas, such as air or oxygen-enriched air. The partial pressure of oxygen in the treating gas may range widely, for example, from about 0.1 to 30 atmospheres, but usually the total gas pressure will not exceed about 25 atmospheres. The factors of time, partial pressure and extent of vanadium stabilization may be chosen with a view to the most economically feasible set of conditions. It is preferred to continue the oxygen treatment for at least about 15 or 30 minutes with a gas containing at least about 1%, preferably at least about 10% oxygen. The maximum practical time of treatment will usually vary from about 4 to 24 hours, depending on the type of equipment used.

The chlorination method of the invention is of value, not only in the removal of vanadium from the catalyst but also in putting nickel poisons into a form soluble or dispersible in an aqueous medium. Also, the chlorinating method may be used as a supplement, primarily for vanadium removal, to a complete processing scheme for nickel removal in which chlorination does not play a significant part. Sulfiding of the poisoned catalyst has been found to be advantageous for nickel and perhaps vanadium contaminant removal by subsequent chlorination and water washing or by other subsequent treatments which put nickel into a soluble, dispersible or volatile form, or which dissolve or disperse nickel directly from the sulfided catalyst. Sulfiding is described in copending patent applications Serial Nos. 763,834, 842,618, and 53,380.

The sulfiding step can be performed by contacting the poisoned catalyst with elemental sulfur vapors, or more conveninetly by contacting the poisoned catalyst with a volatile sulfide such as $H_2S$, $CS_2$ or a mercaptan. The contact with the sulfur-containing vapor can be performed at an elevated temperature generally in the range of about 500 to 1500° F., preferably about 800 to 1300° F. Other treating conditions can include a sulfur-containing vapor partial pressure of about 0.1 to 30 atmospheres or more, preferably about 0.5 to 25 atmospheres. Hydrogen sulfide is the preferred sulfiding agent. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for instance at least about 5 or 10 minutes up to about 20 hours or more depending on these conditions and the severity of the poisoning. Temperatures of about 900 to 1200° F. and pressures approximating 1 atmosphere or less seem near optimum for sulfiding and this treatment often continues for at least 1 or 2 hours but the time, of course, can depend upon the manner of contacting the catalyst and sulfiding agent and the nature of the treating system, e.g., batch or continuous, as well as the rate of diffusion within the catalyst matrix. The sulfiding step performs the function not only of supplying a sulfur-containing metal compound which may be easily converted to chloride form but also appears to concentrate some metal poisons, especially nickel, at the surface of the catalyst particle.

After conversion by chlorination and usually after vaporization of vanadium chlorides the catalyst is washed in a liquid aqueous medium to remove metal, for instance nickel chloride, preferably after the catalyst is cooled to avoid the use of excessive pressures to maintain the liquid phase. The catalyst structure may be quite sensitive to HCl formed in the treatment, so that several precautions should be observed in the aqueous liquid washing. A great excess of water can be used, for instance sufficient to give a slurry containing only minor amounts of solids, say about 2–20%. Also, the catalyst should not be allowed to remain in this slurry for too long a time, ordinarily not more than 5 minutes; a residence time of 2–3 minutes in the original wash water is generally preferred. Temperatures of about 150° F. to the boiling point of water are helpful in increasing the solubility of the chloride. Temperatures above 212° F. and elevated pressures may be used but the results do not seem to justify the added equipment. Contact with the hot catalyst may be sufficient to raise the temperature of the water from ambient temperature to around the boiling point. The aqueous liquid is preferably acid and a weakly acid condition may be obtained by the chlorides generally present in a chlorinated catalyst which has not been purged too severely.

As mentioned, the catalyst may be given a basic aqueous wash after the slightly acidic wash. This wash serves for the removal from the catalyst of available vanadium remaining on it, perhaps due to insufficient purging in the chlorination step. In such a wash, as disclosed in copending application S.N. 39,810, the pH is frequently greater than about 7.5 and the solution contains ammonium ions, for example $NH_4^+$ ions or organic-substituted $NH_4^+$ ions such as methyl ammonium and quaternary hydrocarbon radical ammoniums. The aqueous wash solution can be prepared by addition of a dry reagent or a concentrated solution of the reagent to water, preferably distilled or deionized water. Ammonia or methylamine gas may be dissolved directly in water. Preferred solutions use ammonium hydroxide and have a pH of about 8 to 11. Very short contact times, for example, about a minute, are satisfactory, while the time of washing may last 2 to 5 hours or longer.

After the acidic or ammonium wash the catalyst slurry can be filtered to give a cake which may be reslurried with water or rinsed in other ways, such as, for example, by a water wash on the filter, and the rinsing may be repeated, if desired, several times. After this or after the final treatment which may be used in the catalyst demetallization procedure, the catalyst is conducted to its conversion system, for instance to the hydrocarbon conversion reactor or catalyst regenerator, although it may be desirable first to dry the catalyst filter cake or filter cake slurry at say about 250 to 450° F. and also, prior to reusing the catalyst in the conversion operation it can be calcined in air as described above.

Alternative to the removal of nickel contaminants by procedures involving contact of the catalyst with aqueous media after chlorination, nickel poison may be removed from the catalyst as the volatile nickel carbonyl by treatment with carbon monoxide, as described in copending application Serial No. 47,598. In such a procedure the catalyst is treated with hydrogen at an elevated temperature during which nickel contaminant is reduced to the elemental state, then treated preferably under elevated pressure and at a lower temperature, with carbon monoxide, during which nickel carbonyl is formed and flushed off the catalyst surface. Some iron contaminant is also removed by this carbonylation treatment.

Hydrogenation takes place at a temperature of about 800 to 1600° F., at a pressure from atmospheric or less up to about 1000 p.s.i.g. with a vapor containing 10 to 100% hydrogen. Preferred conditions are a pressure up to about 15 p.s.i.g. and a temperature of about 1100 to 1300° F. and a hydrogen content greater than about 80 mole percent. The hydrogenation is continued until surface accumulations of poisoning metals, particularly nickel, are substantially reduced to the elemental state.

Carbonylation takes place at a temperature substantially lower than the hydrogenation, from about ambient temperature to 300° F. maximum and at a pressure up to about 2000 p.s.i.g., with a gas containing about 50–100 mole percent CO. Preferred conditions include greater than about 90 mole percent CO, a pressure of up to about 800 p.s.i.g. and a temperature of about 100–180° F. The CO treatment generally serves both to convert the elemental metals, especially nickel and iron, to volatile carbonyls and to remove the carbonyls.

The demetallization procedure of this invention has been found to be highly successful when used in conjunction with fluidized catalyst hydrocarbon conversion systems to control the amount of metal poisons on the catalyst. When such catalysts are processed, a fluidized solids technique is recommended for these vapor contact demetallization procedures as a way to shorten the time requirements. Any given step in the demetallization treatment is usually continued for a time sufficient to effect a substantial conversion or removal of poisoning metal and ultimately results in a substantial increase in metals removal compared with that which would have been removed if the particular step had not been performed. After the available catalytically active poisoning metal has been removed, in any removal procedure, further reaction time may have relatively little effect on the catalytic activity of the depoisoned catalyst, although further metals content may be removed by repeated or other treatments. Inert gases frequently may be employed after contact with reactive vapors to remove any of these vapors entrained in the catalyst or to purge the catalyst of reaction products. The thoroughness of treatment of any quantum of catalyst in commercial practice is balanced against the demetallization rate chosen, that is, the amount of catalyst, as compared to the total catalyst in the conversion system proper, which is subjected to the demetallization treatment per unit of time. A high rate of catalyst withdrawal from the conversion system and quick passage through a mild demetallization procedure may suffice as readily as a more intensive demetallization at a slower rate to keep the total of poisoning metal in the conversion reactor within the tolerance of the unit for poison.

The catalyst to be treated may be removed from the hydrocarbon conversion system—that is, the stream of catalyst which in most conventional procedures is cycled between conversion and regenerating operations—before the poison content reaches about 5000 to 10,000 p.p.m., the poisoning metals being calculated as their common oxides. Catalyst demetallization is not economically justified unless the catalyst contains at least about 100 p.p.m. nickel and/or 250 p.p.m. vanadium. Preferably the metals level is allowed to exceed about 150 p.p.m. nickel and/or 500 p.p.m. vanadium so that total metals removal will be greater per pass through the demetallizer. A suitable amount, generally a very small portion of the catalyst is removed from the hydrocarbon conversion system and given the chlorination treatment after the oxidation regeneration which serves to remove carbonaceous deposits. With a continuously circulating catalyst stream, such as in the ordinary "fluid" system this may conveniently be done by the intermittent or continuous removal of a slip-stream of catalyst from the regenerator standpipe. The treatment of this invention is effective despite the presence of a small amount of carbon on the treated catalyst, but when there is coke on the catalyst, residual chlorine on the catalyst after chlorination is frequently at a higher level and is more difficult to remove. Also, where the catalyst is sent to the high temperature treatment with molecular oxygen-containing gas before it is substantially carbon free, the length of oxygen treatment, as recited above, is reckoned from the time that the catalyst reaches the substantially carbon-free state, that is the state where little, if any, carbon is burned or oxygen consumed even when the catalyst is contacted with oxygen at temperatures conducive to combustion.

EXAMPLES

The following examples are illustrative of the invention but should not be considered limiting. Analyses used were obtained by X-ray fluorescence or by spot tests.

A "Nalcat" synthetic gel silica-alumina fluid-type cracking catalyst composed of about 22% $Al_2O_3$, substantially the rest $SiO_2$, is used in a commercial catalytic cracking conversion unit, using conventional fluidized catalyst techniques, including cracking and air regeneration to convert a feedstock (A) comprising a blend of Wyoming and Mid-Continent gas oils containing 1.0 p.p.m. Fe, 0.3 p.p.m. NiO, 1.2 p.p.m. $V_2O_5$ and about 2 weight percent sulfur. This gas oil blend has a gravity (API) of 24°, a carbon residue of about 0.3 weight percent and a boiling range of about 500 to 1000° F. When this catalyst has the poisoning metals content of 332 p.p.m. NiO, 4366 p.p.m. $V_2O_5$ and 0.398% Fe, a sample of the catalyst is removed from the cracking system after regeneration. A 42.9 gram batch of this catalyst sample, treated with steam to simulate the condition of a catalyst which is at equilibrium in the cracking system, was used to test-crack a petroleum hydrocarbon East Texas gas oil fraction (feedstock B) having the following approximate characteristics:

| | |
|---|---|
| IBP (° F.) | 490–510 |
| 10% | 530–550 |
| 50% | 580–600 |
| 90% | 650–670 |
| EP | 690–710 |
| Gravity (API) _____degrees__ | 33–35 |
| Viscosity (SUS) at 100° F. | 40–45 |
| Aniline point _____° F__ | 170–175 |
| Pour point _____° F__ | 35–40 |
| Sulfur _____percent__ | 0.3 |

An eight-pound batch of this catalyst is treated at about 600° F. for about one hour with a vaporous chlorinating mixture made by contacting a liquid carbon disulfide with $Cl_2$ gas. After this the catalyst is slurried in deionized water, quickly filtered, dried and calcined. After the treatment this catalyst sample has a NiO content of about 336 p.p.m., a $V_2O_5$ content of about 3710 p.p.m. and contains 0.351% Fe, no chlorine, 21.5% $Al_2O_3$ and 77.5% $SiO_2$ with a surface area of about 144 square meters per gram, for a removal of 15% of the vanadium and 12% of the iron. This sample, after steaming, is conducted to the test-cracking process on Feedstock B with the results superior to those obtained using the undemetallized catalyst.

A "Nalcat" synthetic gel silica-alumina fluid type cracking catalyst composed of about 26% $Al_2O_3$, substantially the rest $SiO_2$ is used in a commercial catalytic cracking conversion unit, using conventional fluidized catalyst techniques, including cracking of feedstock A and air regeneration. A 500 gram batch of this catalyst is removed from the cracking system after regeneration. A 42.9 gram sample of this catalyst gives the cracking results reported in Table I below for the base catalyst when used to test crack feedstock B. The remaining amount of this batch is then subjected to the action of air for about 4 hours at 1300° F. and $H_2S$ at about 1175° F. for about 1 hour and cooled in a fluidizing flow of nitrogen gas to about 600° F. The catalyst is then divided into nine 50.8 gram samples. While each sample is being fluidized in chlorine liquid carbon disulfide is introduced into the chlorine stream entering the bottom of the chlorination chamber. In each of these runs the amount of chlorine and carbon disulfide introduced is varied, as shown below in Table I. After chlorination each sample is slurried with water and quickly filtered. The catalyst is washed on the filter until all signs of chloride ion are gone from the wash water. The washed catalyst is then pan dried at about 300° C. overnight. Each sample is sent to a catalytic cracking activity test unit and has the activity reported in Table I in cracking feedstock B. The results of the demetallization process on these samples are also shown in this table.

Table I

| Sample | Base | 1 | 2 | 3 | 4 | 5 | 6 | 7 | 8 | 9 |
|---|---|---|---|---|---|---|---|---|---|---|
| Time (min.) | | 60 | 60 | 60 | 60 | 60 | 60 | 15 | 15 | 15 |
| Chlorinating mixture, wt. percent reagent based on catalyst: | | | | | | | | | | |
| $Cl_2$ | None | 5 | 3 | 1 | 5 | 3 | 1 | 12 | 12 | 12 |
| $CS_2$ | | 1.1 | 1.1 | 1.1 | .56 | .56 | .56 | 0.45 | 0.9 | 2.25 |
| Metals content: | | | | | | | | | | |
| P.p.m. NiO | 328 | 59 | 61 | 60 | 68 | 67 | 71 | 56 | 72 | 69 |
| P.p.m. $V_2O_5$ | 4,320 | 2,984 | 2,975 | 2,974 | 3,064 | 3,188 | 3,283 | 3,175 | 3,101 | 3,093 |
| Percent Fe | 0.288 | 0.229 | 0.224 | 0.226 | 0.238 | 0.267 | 0.289 | 0.265 | 0.245 | 0.220 |
| Percent metals removal: | | | | | | | | | | |
| Ni | | 82 | 81 | 82 | 79 | 80 | 78 | 83 | 78 | 79 |
| V | | 31 | 31 | 31 | 30 | 26 | 24 | 26 | 28 | 28 |
| Fe | | 20 | 22 | 22 | 18 | 8 | | 8 | 15 | 24 |
| Test cracking: | | | | | | | | | | |
| Relative activity | 35.6 | 40.3 | 44.0 | 43.9 | 42.0 | 40.6 | 40.8 | 42.2 | 42.8 | 42.0 |
| Distillate+loss | 33.6 | 35.9 | 37.7 | 37.5 | 36.7 | 36.0 | 36.1 | 36.8 | 37.1 | 36.8 |
| Gas factor | 1.50 | 1.17 | 1.22 | 1.16 | 1.23 | 1.24 | 1.31 | 1.24 | 1.29 | 1.22 |
| Coke factor | 1.12 | 0.87 | 0.85 | 0.89 | 0.90 | 0.97 | 1.04 | 1.04 | 0.88 | 0.90 |
| Gas gravity | 1.10 | 1.34 | 1.32 | 1.39 | 1.31 | 1.32 | 1.22 | 1.29 | 1.29 | 1.31 |

These results show the effectiveness of using carbon disulfide and chlorine vapors for chlorination to remove vanadium poisons from a catalyst with subsequent improvement in conversion results thereby obtained. They also show the beneficial effect on the removal of the metal poisons, especially nickel, of a sulfiding treatment prior to the chlorination. Specifically, test samples 1 to 6 show that varying the weight percent $Cl_2$ from 1 to 5% produces no apparent further improvement in demetallization efficiency and that the addition of about 1 weight percent carbon disulfide effectively demetallizes the cracking catalyst. Test samples 7 to 9 demonstrate the increase in iron removal with nickel and vanadium removal remaining substantially constant when the amount of carbon disulfide is increased and the contact time is shortened to 15 minutes.

It is claimed:

1. In a demetallization method for the catalyst of a cracking system wherein a hydrocarbon feedstock heavier than gasoline and containing vanadium is contacted in a cracking zone at an elevated temperature with a synthetic gel, silica-based cracking catalyst whereby gasoline is produced and vanadium deposits on the catalyst and in which system catalyst is cycled between said cracking zone and a regeneration zone in which carbon is oxidized and thereby removed from the catalyst and in which demetallization method a portion of the catalyst is bled from the cracking system, chlorinated with a chlorinating vapor, demetallized to remove vanadium and returned to a cracking system, the improvement in contacting with a chlorinating vapor which comprises introducing bled catalyst into a chlorinating zone where it is contacted at a temperature of up to about 1000° F. with an essentially anhydrous vapor formed by contacting one part of carbon disulfide with about 0.8 to 30 parts of a chlorine-containing gas selected from the group consisting of molecular chlorine and HCl in the chlorinating zone.

2. The method of claim 1 in which the chlorine containing gas is molecular chlorine.

3. The method of claim 1 in which the chlorination is at a temperature of about 550 to 650° F.

4. The method of claim 1 wherein the amount of vapor is in the range of about 1–20% based on the weight of the catalyst.

5. The method of claim 1 wherein the amount of carbon disulfide introduced is in the range of about 0.5 to 6% based on the weight of the catalyst.

6. In a method for improving the cracking ability of a synthetic gel silica-based hydrocarbon conversion catalyst poisoned by use in the conversion at elevated temperature of a hydrocarbon feedstock containing vanadium, without undue deterioration of the catalyst, the steps which comprise removing the catalyst from the hydrocarbon conversion system, introducing the catalyst into a chlorinating zone where it is chlorinated at a temperature of up to about 1000° F. with an essentially anhydrous vapor formed by contacting one part of carbon disulfide with about 0.8 to 30 parts of a chlorine-containing gas selected from the group consisting of molecular chlorine and HCl in the chlorinating zone, removing chlorinated metal components from the catalyst and conducting the catalyst to a hydrocarbon conversion system.

7. The method of claim 6 in which the hydrocarbon conversion is cracking.

8. In a method for improving the cracking ability of a synthetic gel silica-based hydrocarbon conversion catalyst poisoned by use in the conversion at elevated temperature of a hydrocarbon feedstock containing vanadium, without undue deterioration of the catalyst, the steps which comprise removing the catalyst from the hydrocarbon conversion system, introducing the catalyst into a chlorinating zone where it is chlorinated at a temperature of about 300 to 1000° F. with an essentially anhydrous vapor formed by contacting one part of carbon disulfide with about 0.8 to 30 parts of a chlorine-containing gas selected from the group consisting of molecular chlorine and HCl in the chlorinating zone, for a period of about 5 to 60 minutes said carbon disulfide introduced in amounts of about 0.5 to 6% based on the weight of the catalyst to provide with the chlorine-containing gas an essentially anhydrous vapor in amounts of about 1 to 20% based on the weight of the catalyst, removing chlorinated metal components from the catalyst and conducting the catalyst to a hydrocarbon conversion system.

9. In a method for improving the cracking ability of a synthetic gel silica-based hydrocarbon conversion catalyst poisoned by use in the conversion at elevated temperatures of a hydrocarbon feedstock containing nickel and vanadium, without undue deterioration of the catalyst, the steps which comprise removing the catalyst from the hydrocarbon conversion system, contacting the catalyst with a molecular oxygen-containing gas at a temperature of about 1150° to 1600° F., sulfiding the poisoning metal of the catalyst by contact with $H_2S$ at a temperature of about 500° to 1500° F., chlorinating the poisoning metal sulfide by contact at a temperature of about 300° to 1000° F. with a chlorinating agent formed by contacting one part of carbon disulfide with about 0.8 to 30 parts of a chlorine-containing gas selected from the group consisting of molecular chlorine and HCl, removing chlorinated metal components from the catalyst by washing the catalyst in an aqueous acidic environment with an aqueous liquid, and conducting the catalyst to a hydrocarbon conversion system.

References Cited by the Examiner

UNITED STATES PATENTS

| | | | |
|---|---|---|---|
| 2,388,302 | 11/45 | Weyl | 252—411 |
| 2,481,253 | 9/49 | Snyder | 252—415 X |
| 2,488,744 | 11/49 | Snyder | 252—415 X |
| 2,494,556 | 1/50 | Hornaday | 252—413 |
| 2,977,323 | 3/61 | Johnson et al. | 252—415 |

MAURICE A. BRINDISI, *Primary Examiner.*

JULIUS GREENWALD, *Examiner.*